Patented Sept. 4, 1928.

1,683,104

UNITED STATES PATENT OFFICE.

WALTER SCHOELLER, OF BERLIN-WESTEND, AND HANS GEORG ALLARDT, OF BERLIN-REINICKENDORF-WEST, GERMANY, ASSIGNORS TO THE FIRM CHEMISCHE FABRIK AUF ACTIEN (VORM. E. SCHERING), OF BERLIN, GERMANY.

AURO MERCAPTO CARBOXYLIC ACID AND PROCESS OF MAKING SAME.

No Drawing. Application filed February 10, 1927, Serial No. 167,350, and in Germany February 17, 1926.

Our invention refers to a new product being an aliphatic auro mercapto carboxylic acid or a metal salt thereof. The invention also includes the method of producing such products.

The alkali metal salts of the aliphatic auro mercapto carboxylic acids are soluble in water. The constitution of the compounds corresponds to the general formula X—S·Au wherein X stands for the radicle of an aliphatic carboxylic acid or a corresponding alkali metal salt.

We obtain these new compounds by causing an auric salt to act on an aliphatic mercapto carboxylic acid, in a neutral, acid or alkaline medium with or without the addition of sulphur dioxide or a salt thereof.

*Example 1:*

2 grams thiolactic acid are dissolved in 20 ccms acetic ether and a solution of 3.5 grams potassium auribromide is slowly added to the first solution drop by drop under cooling and stirring. Stirring is continued until the solution has become altogether colorless, whereupon the acetic ether is evaporated in vacuo, the residue boiled with water and filtered by suction and rinsed with a little alcohol and ether. The residue consists of pure α-auro mercapto propionic acid having the formula

CH₃·CH—COOH
|
S·Au

By dissolving this compound in the required quantity of normal caustic soda solution and precipitation with alcohol we obtain the sodium salt, which is preferably redissolved and precipitated anew in order to purify it.

This salt forms a yellowish amorphous powder which is readily soluble in water, insoluble in organic solvents and contains 60.5 per cent gold (calculated percentage 60.8).

*Example 2:*

14 grams cystein hydrochloride (hydrochloride of β-mercapto-α-amino propionic acid) are dissolved in 150 ccms water. To this solution are added 130 ccms of a 4.4 per cent solution of sulphur dioxide. At 0° C. 525 ccms of a 10 per cent potassium auribromide solution are slowly introduced into the mixture under stirring. When the solution has lost its color, the white powder, which has settled down, is separated by suction and dissolved in the required quantity of normal caustic soda. This solution is filtered and the fivefold volume of alcohol is added to precipitate the sodium salt, which is readily soluble in water, insoluble in alcohol and the usual solvents and contains 57.5 per cent gold (calculated precentage 58.1). It corresponds to the formula

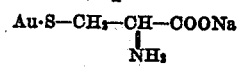
Au·S—CH₂—CH—COONa
|
NH₂

The new compounds are distinguished by valuable therapeutical properties.

Various changes may be made in the details disclosed in the foregoing specification without departing from the invention or sacrificing the advantages thereof. In the claims affixed to this specification the term "a radical of an aliphatic carboxylic acid" is intended to mean univalent groups with an open chain of C-atoms, to which is linked a carboxyl group, the typical hydrogen atom in which may also be replaced by a salt of an alkali metal.

We claim:—

1. As a new product a compound having the general formula X—S·Au, wherein X is a radical of an aliphatic carboxylic compound, the alkali metal salts being soluble in water and having valuable therapeutical properties.

2. As a new product the sodium salt of β-mercapto-α-amino propionic acid, having the formula

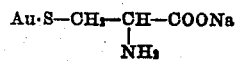
Au·S—CH₂—CH—COONa
|
NH₂ and being a white powder which readily dissolves in water, is insoluble in alcohol and other organic solvents and contains about 58 per cent gold.

3. The method of producing an aliphatic auro mercapto carboxylic acid comprising acting with an auri salt on an aliphatic mercapto carboxylic acid.

4. The method of producing an aliphatic auro mercapto carboxylic acid comprising acting with an auri salt on an aliphatic mercapto carboxylic acid in the presence of sulphurdioxide.

In testimony whereof we affix our signatures.

WALTER SCHOELLER.
HANS GEORG ALLARDT.